United States Patent Office 3,125,433
Patented Mar. 17, 1964

3,125,433
METHOD OF INCREASING FRUIT SET
Gustave K. Kohn, Berkeley, Calif., assignor to California Research Corporation, San Francisco, Calif., a corporation of Delaware
No Drawing. Filed Mar. 23, 1961, Ser. No. 97,735
4 Claims. (Cl. 71—2.6)

This invention relates a method of stimulating plant growth. More particularly, the invention is directed to a method of increasing fruit-set in plants by treating these plants with a growth-stimulating composition containing a halo-substituted m-toluamide having from 1 to 3 halogens on the ring, these halogens being chlorine, bromine, or their mixtures.

Many compounds are known in the prior art to affect the growth of various plants. These compounds serve to prevent fruit-drop, form seedless fruit, alter the leaf shape, or increase fruit-set. The compounds of the instant invention are useful for increasing fruit-set.

Fruit-set is the fertilization of plant seeds which then mature into fruit. The greater the fruit-set, the more fruit a particular plant will bear. Two factors are of prime importance in affecting fruit-set. The first is the number of blossoms which form on a plant, and the second is the number of these blossoms which drop prior to yielding fruit. A suitable growth stimulant for increasing fruit-set must either increase blossom formation, decrease blossom-drop, or both, without causing any concomitant harm to the plant. Various chemicals have been tried as growth stimulants, many of which are known herbicides. However, certain of these herbicides, although possessing growth-stimulating properties, may not be used for this purpose because of their high degree of phytotoxicity. For example, a well-known halogenated aromatic herbicide, trichlorobenzoic acid, was tried for stimulating plant growth. When applied in amounts sufficient to stimulate the plant growth and increase the fruit-set, it was found that the level of phytotoxicity was so high that the plants were subjected to a severe epinasty and burn, and subsequently died.

Contrary to this known halogenated aromatic compound of the prior art, it has now been discovered that a particular class of chemicals, namely, the halosubstituted m-toluamides having from 1 to 3 halogens selected from the class consisting of chlorine and bromine on the ring, may be used as plant-growth stimulants. These compounds, when applied with a suitable carrier, serve both to increase the rate of blossom formation and to decrease the amount of blossom-drop, thereby substantially increasing the fruit-set in plants; yet the compounds of this invention are essentially nonphytotoxic at the concentrations required to achieve this growth-stimulating effect.

The compounds included within this invention are the mono-, di-, and trihalo-m-toluamides wherein the halogens are chlorine, bromine, or their mixtures, chlorine being preferred. Specific preferred compounds of the invention are chloro-m-toluamide and dichloro-m-toluamide. The preferred compounds of the invention have been found to be particularly effective in both increasing blossom formation and decreasing blossom-drop on tomato plants, thereby substantially increasing the fruit-set in these plants.

The compounds of this invention may be prepared by conventional methods of preparation. Generally, a halosubstituted or unsubstituted m-toluyl chloride is reacted with aqueous ammonium hydroxide at temperatures between about 0° and 150° C. The reaction is extremely rapid and the resultant m-toluamide separates as a white solid from the solution. This product may then be filtered and, if desired, crystallized from a variety of solvents, such as ether, alcohol, benzene, etc.

The particular halosubstituted m-toluyl chloride starting material may be prepared by ring halogenation of m-toluyl chloride using a ring chlorination catalyst such as $FeCl_3$, etc. This reaction is carried out with or without a suitable solvent and is generally done at a temperature of about 50–150° C. Higher temperatures are required to effect polychlorination. Chlorination is continued until a specific gain in molecular weight has been reached, indicating the particular chlorinated or polychlorinated compound has been obtained.

Certain specific compounds of the invention and their methods of preparation are shown in the following examples. It is to be understood, however, that these examples are interposed only for the purpose of illustration of specific compounds of the invention and their method of preparation, and hence they are not to be construed as further limitations upon the scope of the invention.

*Example 1*

115 g. of m-toluyl chloride were placed in an agitated reaction vessel. 15 g. of anhydrous ferric chloride were added and then chlorine gas was introduced. The temperature rose to about 85° C. within a few minutes. The introduction of chlorine was continued for about 2½ hours whereupon the crude chloro-m-toluyl chloride was stripped to a pot temperature of about 85° C. at a pressure of 23 mm. The product was distilled, and a fraction was collected boiling at 87–90° C. at 0.4 mm. pressure.

15 g. aqueous ammonium hydroxide were added to 5.7 g. of the above chloro-m-toluyl chloride while agitating and cooling the mixture. White solids formed which were water-washed, air-dried, and crystallized from benzene. The resulting product had a melting point of 129–140° C. and was analyzed to be chloro-m-toluamide.

*Example 2*

115 g. of m-toluyl chloride were placed in an agitated reaction vessel. 15 g. of anhydrous ferric chloride were added and then chlorine gas was introduced. The temperature rose to about 85° C. within a few minutes. The introduction of chlorine was continued for about 2½ hours whereupon the crude dichloro-m-toluyl chloride was stripped with a pot temperature of about 85° C. and pressure of 23 mm. The product was distilled, and a fraction was collected boiling at 91–94° C. at 0.4 mm. pressure.

20 g. aqueous ammonium hydroxide were added to 10 g. of the above dichloro-m-toluyl chloride while agitating and cooling the mixture. White solids formed which were water-washed, air-dried, and crystallized from benzene. The resulting product had a melting point of 161–168° C. and was analyzed to be substantially dichloro-m-toluamide.

As an illustration of the utility of the compounds of this invention as plant-growth stimulants, the following test results are presented.

Three replicate, single-plant tomatoes, variety Rutgers, were sprayed at 15 p.s.i. with an aqueous suspension of a 5 percent kerosene and acetone formulation of chloro-m-toluamide. The concentration of chloro-m-toluamide in the aqueous suspension was 1000 p.p.m. A control sample also containing three replicates of the same tomato plants, was left unsprayed. The unsprayed control sample had a 48.5 percent average blossom-drop, and the sample treated with chloro-m-toluamide had an average percentage blossom-drop of only about 15 percent, a difference of 33 percent and an improvement of over 300 percent. A difference of 22 percent indicates statistically that there was a 99 percent probability that the candidate growth stimulant had a favorable effect in reducing blossom-drop.

When tomato plants were treated in an identical manner with trichlorobenzoic acid at the same concentration, i.e., 1000 p.p.m., an extreme epinasty and burn were caused on the tomato plants, resulting in their subsequent death. In comparison, the phytotoxicity exhibited in the above test using chloro-m-toluamide at the same concentration was slight, if any, and all of the plants fully recovered.

The same experiment was carried out using dichloro-m-toluamide at a concentration of only 50 p.p.m. The blossom-drop percentage was reduced 28 percent below that of the untreated control sample using this compound of the invention, a 22 percent decrease indicating a 99 percent statistical probability that the compound had a favorable effect.

Chloro-m-toluamide was applied in the same manner to three more replicate tomato plants in a concentration of 50 p.p.m. In comparison with the untreated control sample, the samples treated with chloro-m-toluamide had an average of 90 percent more blossoms formed. A 39 percent increase indicates statistically that there is a 99 percent probability that the candidate growth stimulant had a favorable effect in increasing blossom formation.

When trichlorobenzoic acid was applied to the same tomato plants in concentrations of 50 p.p.m., a severe epinasty and burn again occurred, resulting in the subsequent death of the plants. No more than a slight epinasty or burn occurred using the compounds of the invention, and all the plants fully recovered therefrom.

The growth-stimulating compounds of this invention may be applied to the plants as an aqueous spray or in an inert medium, such as a dust, and in admixture with a powdered, solid carrier, such as the various mineral silicates, e.g., mica, talc, pyrophyllite, and clays. The growth-stimulating effect of the compounds of the invention on plants and the minimum concentrations required of compounds of this invention to be effective will vary with the particular compound employed, the formulation used, the age, species, and variety of the plant, and the time of year, climatic conditions, season, weather, etc. Growth-stimulating effects can be obtained at concentrations from about 10 p.p.m. on up. However, concentrations above about 2000 p.p.m. are to be avoided because, at that point, some damage to certain plants may occur. 25–1500 p.p.m. is preferred. The compounds of the invention may be mixed with small amounts of surface-active dispersing agents, such as anionic, nonionic, or cationic surface-active agents. These dispersing agents serve to disperse the compounds of the invention in water for sprays, and also act as wetting agents. The halo-m-toluamides may also be admixed with both a powdered, solid carrier and a surface-active dispersing agent to obtain a wettable powder. This powder may be applied directly to plants or admixed with water to prepare an aqueous suspension.

The growth-stimulating compositions of this invention may be formulated with other compounds having growth-regulating effects, or may be applied in combination with other biologically active ingredients for the protection of plant health.

Obviously, many modifications and variations of the invention, as hereinabove set forth, may be made without departing from the spirit and scope thereof, and therefore only such limitations should be imposed as are indicated in the appended claims.

I claim:

1. A method of increasing fruit-set in tomato plants, which comprises treating said plants with a growth-stimulating amount of a halosubstituted m-toluamide having from 1 to 3 halogens on the annular members of the ring, said halogens being selected from the class consisting of chlorine and bromine.

2. A method according to claim 1 wherein said halosubstituted m-toluamide is monochloro m-toluamide.

3. A method according to claim 2 wherein said halosubstituted m-toluamide is dichloro-m-toluamide.

4. A method of increasing fruit set, which comprises treating fruit-bearing plants with a growth-stimulating amount of a halosubstituted m-toluamide having from 1 to 3 halogens on the annular members of the ring, said halogens being selected from the class consisting of chlorine and bromine.

References Cited in the file of this patent

UNITED STATES PATENTS 2,412,510     Jones _____ Dec. 10, 1956

OTHER REFERENCES

Stempel et al., "Chemical Abstracts," vol. 45, 1951, col. 28861b.

Zimmerman, "Industrial and Engineering Chemistry," vol. 35, No. 5, May 1943, pages 596–601.

Weissberger et al., "Chemical Abstracts," vol. 29, 1935, col. 1794(1).

Eckert et al., "Chemical Abstracts," vol. 16, 1922, page 1756.